INVENTOR.
GLENN B. CARMAN

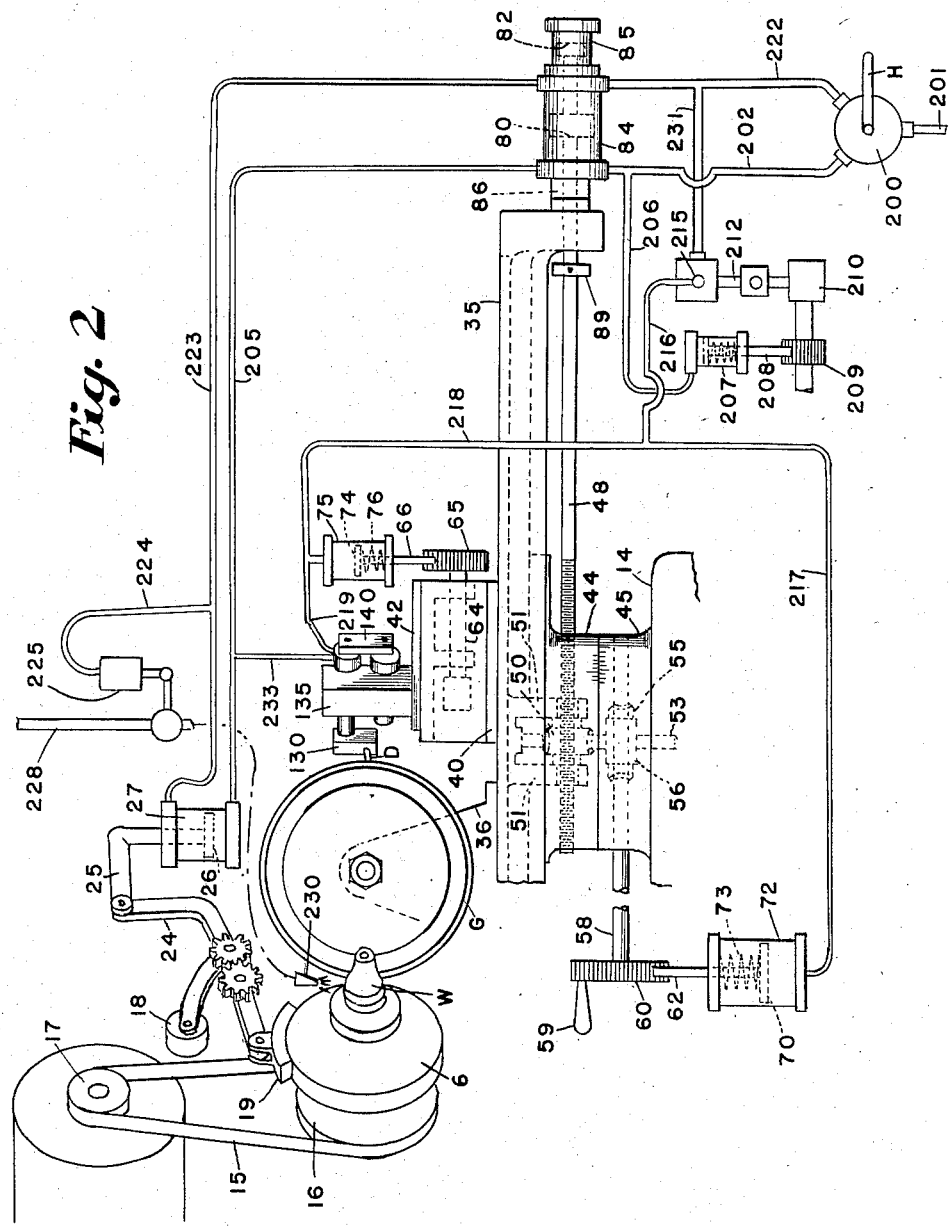

Jan. 11, 1955     G. B. CARMAN     2,699,018
AUTOMATIC GRINDING WHEEL DRESSER AND FEED CONTROL
Filed June 30, 1951     5 Sheets-Sheet 3
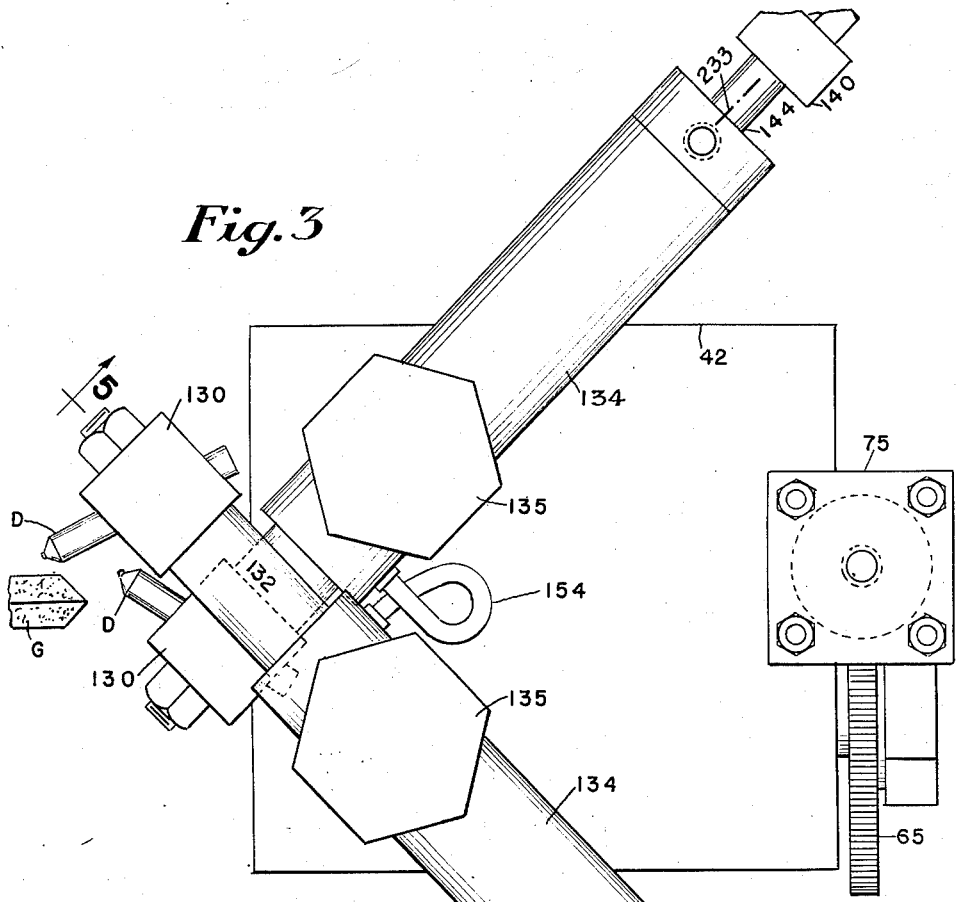
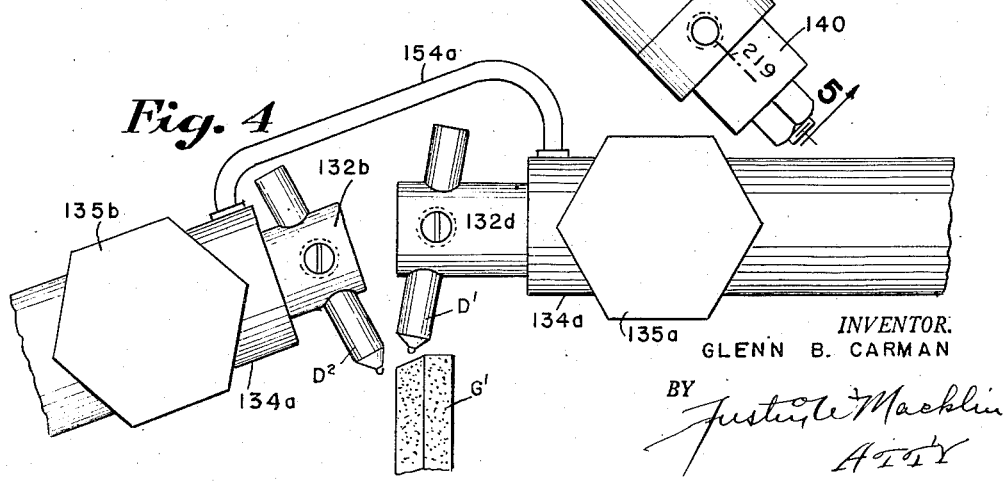
INVENTOR.
GLENN B. CARMAN

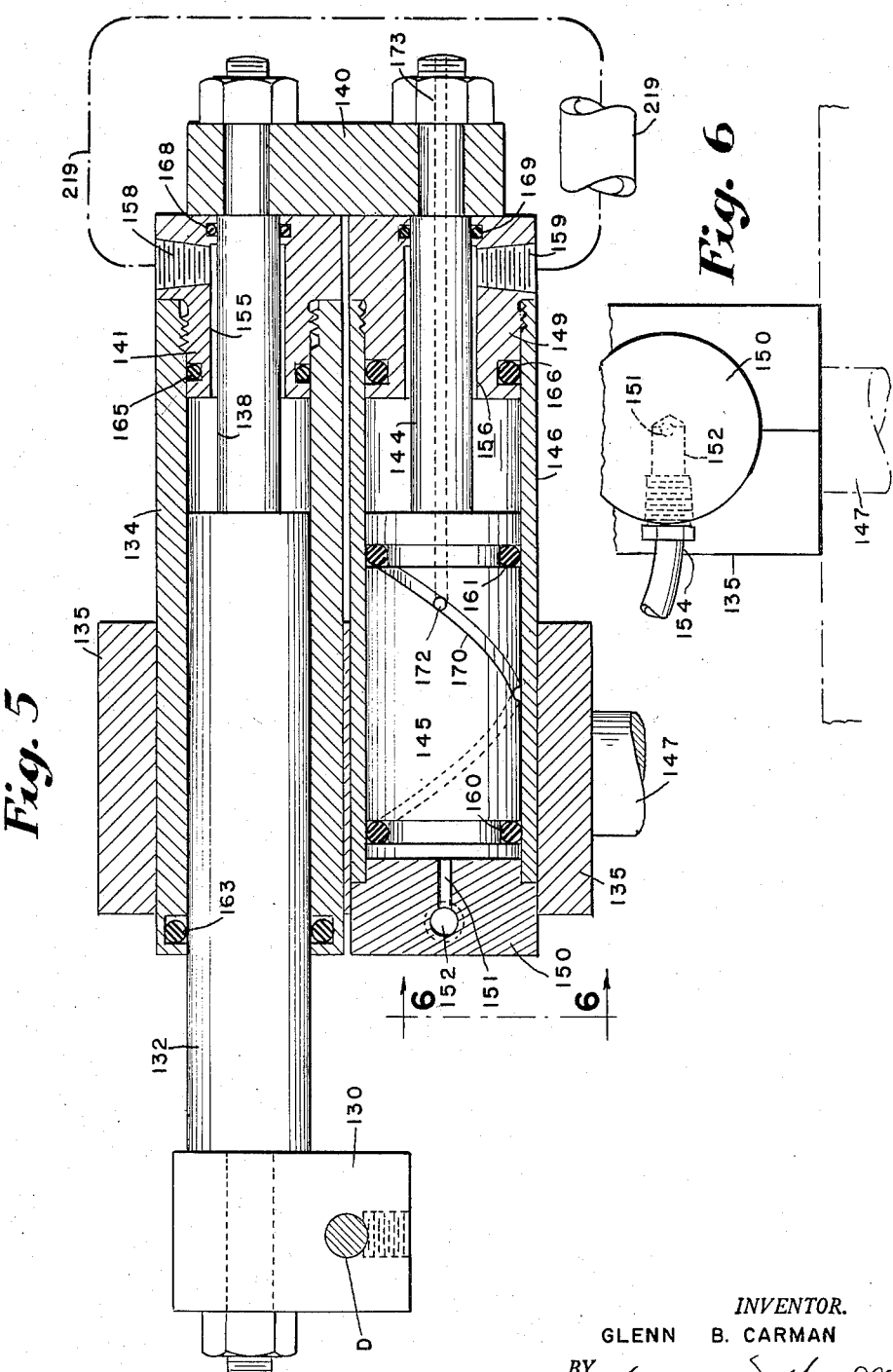

United States Patent Office 2,699,018
Patented Jan. 11, 1955

2,699,018

AUTOMATIC GRINDING WHEEL DRESSER AND FEED CONTROL

Glenn B. Carman, Cleveland Heights, Ohio, assignor to The DeVilbiss Company, Toledo, Ohio, a corporation of Ohio Application June 30, 1951, Serial No. 234,629

16 Claims. (Cl. 51—105)

This invention relates to dressing mechanisms for truing the working surfaces of grinding wheels, and, in particular, it relates to a mechanism which shall be fully automatic in its intermittent dressing operation.

The general object of the invention is to provide a mechanism which may dress one or more surfaces of a grinding wheel, used for precision grinding and finishing of a large number of uniformly similar surfaces on like parts, in high production, and where efficiency and economy as well as accuracy is required.

Heretofore, automatic apparatus has been used with grinding machines for maintaining accurately dressed grinding surfaces.

Such devices have been proposed and shown in prior patents designed for truing the grinding wheel at intervals, and even during the actual grinding of single parts such as in thread grinding—grinding of taps, gauges, or the like. Likewise, it has been proposed to effect the movement of the wheel dressing diamonds by fluid actuation. However, various mechanical difficulties and uncertainties develop in the operation of such devices; wherefor, a general object of the present invention is to provide a simple, effective inexpensive apparatus of this general character which may be used with present types of grinding machines, and which may be capable of maintaining the desired dimensional accuracy of the ground surface or surfaces of uniform parts, with a minimum of manual operation and with ideal uniformity in performance requiring no special skill on the part of the operator.

My device is adaptable for truing a single surface or a plurality of surfaces on the grinding wheel—whether two or three or more—and while maintaining the desired angular and circumferential dimensions of each and all of the surfaces.

A more specific object is to combine the use of oil and air for the desired movements of the grinding wheel with relation to the work, as well as of the dressing diamond tool with relation to the grinding wheel. In this connection, economy of use of the wheel and avoidance of resetting of the machine parts is attained to the extent that surfaces of the precise shape and dimension desired may be ground on a large number of pieces without manual adjustment during the life of a grinding wheel.

The manner of use of oil in the control of the air actuation of the grinding wheel carrying slide and control of a slide carrying the dressing tool or tools is unique in my apparatus and has proven effective in the grinding of large numbers of a wide variety of surfaces.

A specific object of this invention is to so interconnect the actuating means that the wheel is dressed with sufficient frequency that the wear on the grinding wheel is less than the tolerance in dimensional limits. Likewise, the controls uniformly bodily move the wheel toward the work position, the amount of movement compensating for the movement of the dressing tools toward the axis of the grinding wheel.

Other objects include the provision of specific mechanical and fluid-responsive devices for carrying and moving the dressing tools and for moving the main slides consistent with all of the requirements of uniform automatic operation of such an apparatus. Details and advantages of these arrangements will appear in the following description pertaining to the illustrative arrangement appearing in the accompanying drawings, in which:

Fig. 2 is an elevation of substantially the same parts as those shown in Fig. 1, illustrating the relationship of the carrier slides and the work driving and stopping means, and again diagrammatically illustrating the connecting conduits for air actuation;

Fig. 3 is a plan view of a slide and actuating elements for a pair of diamond dressing tools;

Fig. 4 is a fragmentary view showing an arrangement of such tools positioned to operate at a different angle;

Fig. 5 is an axial section through the cylinders for an associated diamond carrier plunger and actuating piston connected therewith;

Fig. 6 is a fragmentary detail of a portion of the left hand end of one of these members.

In the following description like characters designate like or corresponding parts, and it is to be understood that the grinding machine with which the apparatus is associated may be any of various forms or types.

A suitable bed or slideways may support a tail center carrier and work spindle indicated at 10 and 12, and formed on the side of such a bed, not here shown, may be a laterally extending portion of the bed or frame rigidly fixed therewith, and indicated at 14.

The workpiece W may be driven by any suitable connection with the driving spindle, which may be driven in any suitable fashion but preferably so arranged as to be quickly started and stopped.

Figure 1:
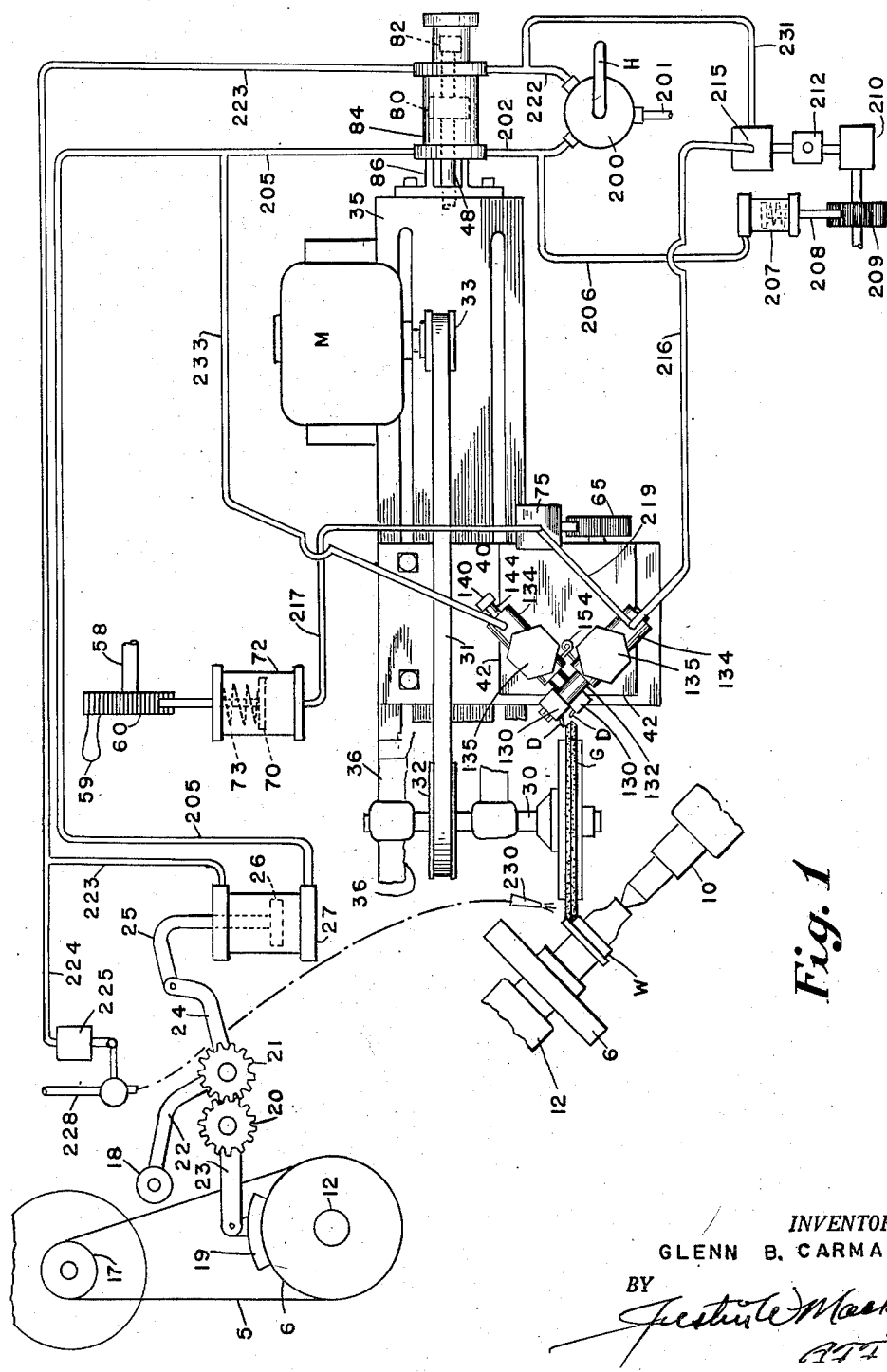
Fig. 1 is a plan view of a grinding wheel and dressing tool-carrying slides, workpiece and rotating mountings therefor, and in this view are shown diagrammatically the power-applying means and connections for the co-ordinating controlling devices are also indicated diagrammatically.

As illustrative of such a driving and stopping arrangement, I have indicated in Figs. 1 and 2 a driving belt 15 running over a pulley 16 from a driving pulley 17. A belt tightener pulley 18 and a brake 19 are alternately moved into operative position in timed relation, to permit removal and replacement of the workpieces, by any suitable means. As shown, gears 20 and 21 connected with the arms 22 and 23 carrying the tightener pulley 18 and brake 19, respectively, are operated by an arm 24 through a connection 25 with the piston 26 (Fig. 2) of an air cylinder 27. The brake 19 may bear against the pulley 16 or on a separate brake wheel 6.

The workpiece W, as indicated, is illustrative of any piece requiring grinding of adjacent surfaces at an angle to each other. In this case grinding is on the face of the flange and a cylindrical surface extending therefrom. The grinding wheel G, accordingly, has its grinding surfaces at a corresponding angle with relation to each other. This wheel is suitably mounted on a spindle 30 which may be driven in any suitable fashion as by a belt 31, pulleys 32 and 33—the latter pulley being shown as driven by a motor M mounted on a main slide 35. The bearings for the grinding wheel spindle are carried on brackets 36 also fixed on the main slide 35. Supported on the main slide on the side of the grinding wheel G, away from the workpiece, is a mounting bracket or slideway member 40 on which is mounted a slide 42 carrying the diamond dressing tools and their actuating slides and supports.

The slide 35 is carried on slideways formed on a revolving head member 44, rotatably fitted to a pedestal 45 rising from a side wing or bed frame member 14.

The arrangement of compound slides—one of which may be revolved to move to various angles with relation to the work spindle—is not uncommon. In such an arrangement it will be seen that as the slide 35 moves on the guideways of the head 44 and carries the grinding wheel and dressing means with it, while the dressing wheel slide may be moved for adjustment independently of and relatively to the main slide.

The main slide is moved by my operating mechanism to carry the grinding wheel to the work and away from it. After completion of the grinding and at intervals following the grinding of a predetermined number of pieces, the dressing tool carrier slide is advanced with relation to the main slide and toward the grinding wheel a minute and predetermined exact amount. At the same time, the main slide is moved toward the workpiece position precisely the same amount by my actuating mechanism and through connections as follows:

The main slide screw 48 is shown as threaded through a nut in the form of a worm gear 50 mounted between dependent ears 51 rigid with the slide. This worm gear may be turned by a worm, not shown, on a shaft indicated at 53, and in turn is actuated by a worm gear 55 and worm 56 on a shaft 58 extending through and to the front of the machine—where it is accessible to an operator. This shaft 58 may be provided with a handle 59 which is here shown as mounted on a disk or wheel 60 having ratchet teeth coacting with an actuating pawl 62 for automatic operation.

Thus, the main slide may be set in the desired position to accommodate the size of the workpiece and the diameter of the grinding wheel through these worm gear connections, and the slide may thereafter be actuated automatically. Similarly, the slide 42 may be moved to the desired position by a screw 64 by manually turning a disk 65, which likewise is provided with ratchet teeth coacting with a pawl 66 for automatically operating the wheel and slide screw 64 to advance the diamond dressing tools at predetermined intervals and in synchronism with the adjusting advance of the main slide.

Spring returned pistons in small air cylinders may be used for actuating these pawls. As shown, the pawl 62 is connected to a piston 70 in a cylinder 72, while a spring 73 normally urges the piston inwardly, and air pressure may move the piston and pawl toward the ratchet teeth, advancing the disk 60 a distance of one or more ratchet teeth, as desired.

Likewise, the pawl 66 is shown as connected to a piston 74 in a cylinder 75, and a spring for return movement is indicated at 76.

For effecting the withdrawing of the main slide and grinding wheel and returning to the workpiece after each grinding operation, the main slide screw 48 is rigidly connected to a piston 80, and in turn also rigidly connected to a similar and smaller piston 82, in cylinders 84 and 85, respectively.

Air under pressure is alternately applied to the inner and outer ends of the piston 80, bodily moving this cylinder 84 with relation to the stationary piston, and through the rigid mounting connection 86 carrying the cylinders on the end of the slide 35, the slide is moved. The oil cylinder 85 and its small piston effect a variable speed and precise control of the main slide movement, and thus of the grinding wheel to the work, and until the completion of the grinding operation. The inward operating motion of the slide 35 is stopped by a collar 89 fixed on the screw member 48.

Figure 7:
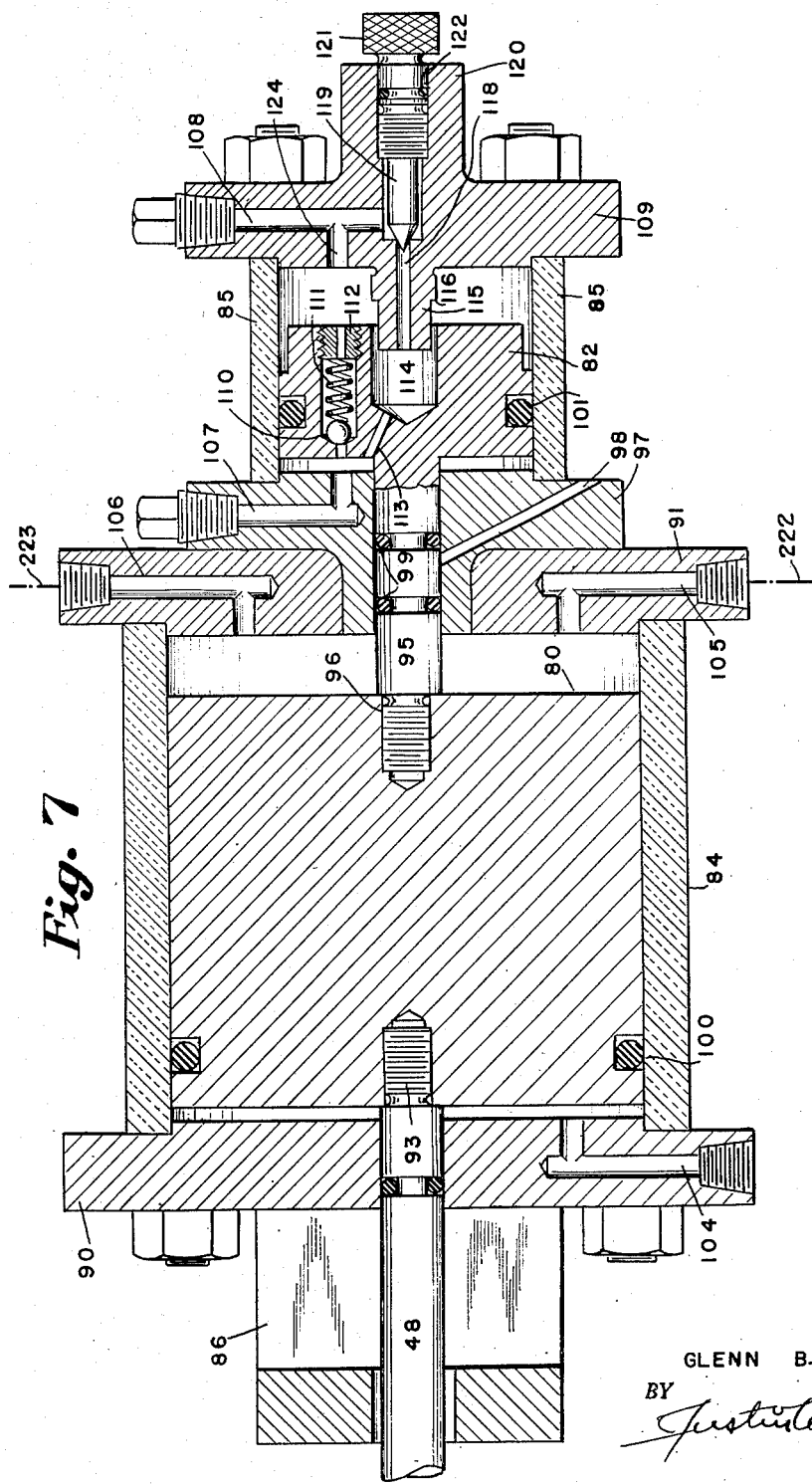
Fig. 7 is an axial section showing pistons connected with the main slide screw and coacting cylinders containing each piston for the air power application and oil control of the movement.

The arrangement of these connected air and oil pistons and connected coacting cylinders, and the means whereby the control is effected appears in Fig. 7. The head of the cylinder 84, here shown as a plate or disk 90, is fitted to one end of the cylinder proper and is shown as rigid with the supporting bracket member 86 which is secured to the end of the main slide.

A similar disk-like plate 91 closes the opposite end of the cylinder 84, and here the piston 80 is illustrated as a cylindrical member slidably fitted within the cylinder 84 and as connected to the end of the main slide screw member 48 by threads indicated at 93. The piston 82 is connected by a stem 95 to the other end of the piston 80 as by threads 96. This stem extends through the central opening in a member 97 fitted to the inner end of the cylinder 85, and secured to the head member 91 of the larger cylinder, and is provided with suitable gasket rings 99 preventing leakage of air in one direction and of oil in the other.

A passage 98, leading from the bore receiving the member 95 and from between the rings 99, prevents air pressure building up in this passage, and precludes it entering the oil chamber of the cylinder 85.

The pistons 80 and 82 are each provided with resilient ring gaskets of the rolling ring type, indicated at 100 and 101, shown as seated in grooves slightly wider than the cross-sectional diameter, permitting slight movement as is customary with this type of ring. Air passages 104 and 105 lead to the opposite ends of the cylinder 84, and air may alternately move the cylinder and slide 35 with respect to the relatively stationary piston 80.

Oil may be supplied through plug-closed passages 107 and 108 to the opposite ends of the piston 82, filling the space, and may circulate through passages from one end of the piston to the other. In one of these passages is a valve ball 110 normally seated by a spring 111 which is held in position by the screw member 112 having an opening therethrough and completing the passage.

The passage 106 leads away from the same end of the cylinder 84 for convenient connection to coordinating operating parts, as will appear in the description of the air controls and connections.

The piston 82 is also provided with a passage 113 leading from a cavity 114 into which extends a projection 115 having an enlarged portion 116 more closely fitting the diameter of the cavity and of shorter length than the projection. Thus, as the projection moves with the cylinder, oil entrapped ahead of it may flow out past the projection, slowly enough to prevent too sudden movement under the influence of the air pressure in the other cylinder.

The shorter enlargement 116 further restricts this escape movement of oil and substantially retards the movement of the projection and cylinders and of the main slide, as the grinding wheel approaches and nearly reaches its grinding position.

This projection is rigid with the outer end member 109, fitted to the cylinder 85, and through the projection is a small central passage 118 closed by a conical valve 119 threaded into a boss 120 and provided with a knurled head 121.

A suitable gasket or packing ring is indicated at 122. The passage 118 communicates with the passage 108 and in turn with the passage 124 when the valve is opened. As the cylinder moves on the piston on the inward movement of the slide, the oil first flows relatively freely past the reduced portion of the projection and through th restricting passage 113. When the closely-fitting enlargement enters the cavity 114, further flow from the right to the left ends of the piston (Fig. 7) is through the passages 124, 108 and 118 under the control of the needle valve 119. Thus, precise control of movement of the main slide is effected at the critical moment when the slide and grinding wheel approach the working position, and during the grinding.

Referring particularly to Figs. 3 and 5, two diamond dressing tools, each designated D, are shown as adjustably mounted in blocks 130, removably secured to the ends of plungers 132.

Each of these plungers extends into and is slidably supported in one of two elongated cylinder members 134, and which, in turn, are carried in supporting blocks 135, and so arranged that the plungers with their dressing tools may alternately pass at an angle to the plane of the wheel G to dress the beveled surfaces. This operation will appear more fully hereinafter.

These blocks, with their slides, may be mounted at any angle desired for effecting movement of the dressing tools to shape the grinding face of the wheel in predetermined angular relation to the plane of the wheel.

The end of each plunger slide 132 is shown as reduced at 138 and as secured to a bridge member 140, and arranged to slide through a closure member 141 threaded into and closing the end of the cylindrical member 134.

Similarly attached to each bridge member 140 is a piston rod element 144 rigid with the piston 145, slidable in a cylinder 146 also rigidly mounted in the block 135, and having its axis parallel to the axis of the plunger 132 and cylinder 134.

As indicated, each of these blocks 135 is rigidly but adjustably secured to the slide plate 42 as by a suitable projection 147 extending into the block 42 and secured in any suitable manner.

The piston rod 144 extends through the bore of a closure 149 fitted into the end of the cylinder 146. The other end of each cylinder 146 is closed by a block 150 which is shown as having an oil passage 151 leading to a transverse opening 152, to which a tubular connection 154 is fitted and which leads to similar passages at the forward end of the other corresponding piston 145.

The connection 154 may be a flexible tube permitting angular adjustment of the blocks 135 and diamond slides, while providing a sealed passage between the forward ends of the two cylinders 146.

Around the extension 138 and piston rod 144, the bore of the closures is enlarged for a portion of the length of these closures, as indicated at 155 and 156, the resulting space forming a passage communicating with threaded openings 158 and 159 for receiving pipe fittings, or like connections with air supply lines, whereby air may be simultaneously applied to the inner ends of the member 132 and the piston 145. The purpose of this arrangement is that while the piston 145 is the principal actuating element which through the bridge 140 will effect movement of the slide plunger 132 and thus move the attached dressing diamond tool, it is desirable to assist this movement to prevent angular strain on the bridge 140 and its connections to the extension 138 and piston rod 139. Thus, all these parts may be made lighter while assuring effective and continuous operation without binding.

The piston 145 is supplied with resilient packing rings 160 and 161 at its ends, and similar sealing and packing rings are provided at the forward end of the cylinder 134 as shown at 163. At the inner ends of the closures 141 and 149 are sealing rings 165 and 166, while the stems or piston rod elements slide through packing rings 168 and 169. Thus, the air entering the cylinders 134 and 146 is sealed from escape, and likewise the oil ahead of each piston 145 is sealed from the air and from escape over the piston.

It has been found that in the operation of this device at times air would escape past the piston 145 and into the body of the oil ahead of the two pistons, thus interfering with the hydraulic action of this interposed oil.

An important feature of the present arrangement, therefore, is that of preventing the actuating air from reaching the interposed and actuating oil. A spiral groove 170 substantially encircling the piston 145, between the packing rings 160 and 161, is connected by a radial passage 172 communicating with an axial passage 173, leading to the open air. This prevents air pressure from building up inside of the gasket at the air end of the piston, and between the packing rings, and thus precludes any air from reaching the interposed actuating oil.

In the operation of the diamond dressing tools air is supplied, under the control arrangement and connections to be described, to the inner end of the piston 145 (and incidentally to the inner end of the slide plunger 132) of one of these pistons and of one set of the cylinders 134 and 146, and exerts a pressure moving the piston to the left in Fig. 5. This movement forces oil ahead of the piston through the passages 151, 152 and 154 to the inner end of the opposite piston 145, and the oil acting as a pusher moves the other piston and its connected diamond tool simultaneously in the opposite direction. This effects one passing of each diamond tool across its surface of the grinding wheel. On the next grinding cycle air is supplied to the other set of piston and plunger cylinders causing its movement in reverse direction and forcing a reverse flow of the interposed actuating oil to push the piston 145 in the other set in its reverse direction.

The interposed actuating oil, therefore, acts as a mechanical positive connection between the two actuating pistons and its flow may be controlled to effect precise desired rate of movement of the dressing tool.

The size of the passage 151 may be predetermined for this purpose although obviously a controlling valve such as the valve 119 on the controlling cylinder 85 may be used to govern the rate of movement of the dressing tool.

Before describing the operating system and controls, and to further illustrate the alternate operation of the diamond tools, reference may be had to the fragmentary and somewhat diagrammatic arrangement illustrated in Fig. 4, in which the grinding wheel G' is shown as having a flat or cylindrical face and another grinding face at an angle thereto, which surfaces may be dressed by the diamond dressing tools D' and D², respectively, carried by slide plungers 132a and 132b. These, as before, are slidable in tubular cylinders 134a and 134b secured in mounting blocks 135a and 135b.

The actuating cylinders for these plungers are shown as connected by a closed passage 154a leading from the inner ends of the cylinders ahead of each of the pistons, and it will be seen that as one diamond carrier moves outwardly, the other one would be receding by reason of the oil being forced from one cylinder to the other.

In the arrangement of Figs. 3 and 5, it is to be understood that one diamond slide is carried above the actuating piston and cylinder, and in the other it is carried below; wherefor, the blocks 130 may extend upwardly and downwardly, respectively, to bring the diamonds to a common radial plane of the grinding wheel and parallel with the movement of the diamond dressing tools, as well as parallel with the planes of movement of the supporting slides.

The air connections for actuating the various automatic operating devices of the mechanism heretofore described are illustrated diagrammatically in Figs. 1 and 2.

At 200 is shown a two-way hand valve to which air under pressure is supplied through a line 201. In one position of the valve handle H, air is led through a passage 202 to the inner end of the cylinder 84 (through the passage 104) and thus to the inner end of the piston 80, which piston is rigidly connected with the main slide screw 48, and thus effects inward sliding movement of the main slide 35, the grinding wheel, dressing devices and other parts carried thereby.

From the line 202, and for convenience by connection with the inner end of the cylinder 84, an air line 205 leads to the cylinder 27 moving its piston 26 and linkage to release the brake 19 and apply the belt tightener 18 to start the work spindle, the workpiece W having been placed in position. In operation, of course, the grinding wheel is continuously driven.

From the line 202 a branch line 206 leads to a pawl-actuating cylinder 207 provided with a spring returned piston, and by which the pawl 208 connected therewith actuates a ratchet counter wheel 209 connected with a valve-actuating device 210 arranged, through a connection indicated at 212, to operate a control valve 215 after a given number of ratchet tooth advances of the wheel tooth advances of the wheel 209. This valve 215, in turn, is connected with the screw-advanced pawl-actuating pistons and cylinders 70 and 72, and 74 and 75, through a line 216 having branches 217 and 218, as shown in Fig. 2. These same or corresponding connections are differently illustrated in the plan view of Fig. 1.

The line from the valve 215 also may lead from line 218 to connect at 219 with one set of actuating piston and dressing tool slide cylinders. (In Fig. 5 this connection is indicated in broken lines as leading to both cylinders 134 and 146.)

As appears in Fig. 1 the connection 217 also leads from the lines 216 and 217 to the main adjusting-screw pawl-actuating cylinder 72, there shown diagrammatically in the upper portion of Fig. 1.

When the handle H of the hand valve 200 moves to another position air is supplied through a line 222 to the outer end of the cylinder 84 and its stationary piston 80 (through the passage 105) where pressure moves the cylinder and main slide 35 outwardly, withdrawing the grinding wheel from the workpiece.

At the same time, through the passage 106 and a line 223, shown as leading to the upper side of the piston 26 and the cylinder 27, the belt-tightening wheel 18 is released and the brake 19 is applied, stopping the driving spindle and permitting immediate removal of the workpiece W.

The valve 200 is of a type which may connect the supply line 201 with either of two connecting lines 202 and 222, and as is usual with such two-way valves (sometimes called three-way valves) when connection is established through one of its connecting lines, the other is opened to a common exhaust port (not shown). Thus, when the ports of the valve connect the supply line 201 with the line 202, the pressure is released from the other line 222, permitting it to exhaust. Likewise, when the opposite connection between 201 and 222 is established, line 202 is opened to the atmosphere.

The branch of the line 223 indicated at 224 may operate a piston and cylinder device 225 to close a valve 228 controlling the flow of grinding liquid to a nozzle at the grinding contact point and indicated at 230. Thus, the grinding liquid may be shut off when the grinding wheel is out of contact with the work.

After the proper number of actuations of the cycle counting ratchet 209, the valve 215 is opened applying air to one of the diamond operating cylinders through the line 216, causing its diamond tool to move outwardly and returning the companion tool, each passing across the wheel G. At the same time, the air moves the piston 74 and screw 64 to advance the slide 42.

After the dressing operation of the diamond tool slides, each moving in one direction, by air through the valve 215 and through the line 216, then, on the next actuation of the air valve 200, air is brought from line 205 to the other diamond moving piston through the line 233 reversing the position of the diamonds but without moving the slide 42 therefor toward the wheel G. This second pass effects a sort of a re-dressing or finishing touch.

Thereafter, although air pressure would be brought through the line 233 on each cycle, i. e., the main slide return, no movement of the diamond slides would be effected until the valve 215 again opened after grinding the prescribed number of pieces. Thus, each diamond passes in an inward and outward direction on two successive return operations of the main valve 200, and then the dressing tools hold their positions until a later cycle when the valve 215 again operates.

It may be noted that the line 205 is shown as leading from the inner end of the cylinder 84 in both Figs. 1 and 2, which may be made by connections not shown in Fig. 7 but which may be similar to the connection indicated at 104 or the connection at the opposite end of the cylinder shown in Fig. 7 and 106. A suitable T connection with the line 202 may be used if desired.

As above indicated, the differences in the diagrams of Figs. 1 and 2 are merely for convenience of layout. The connections and operations are intended to be the same.

Recapitulating the cycle of operation; before the grinding wheel G is worn enough to allow the size of the piece to be larger than permitted by the allowed tolerance in variation of dimension of the surfaces being ground, the wheel will be dressed after moving the dressing diamonds toward the wheel an amount greater than the amount of wear. Likewise, to re-position the now slightly smaller freshly dressed grinding wheel, the main slide is re-positioned by actuating the ratchet wheel 60 through the piston and cylinder 72 and through the worms and gears actuating the main nut 50 on the main slide screw 48.

The wheel diameter is reduced minutely by an amount effected by both wear of the grinding and the dressing of the wheel. This amount is precisely compensated for by the movement of the dressing tool carrier and the main slide. In practice the effectiveness of the grinding wheel surface may be impaired by minute particles of adhering and clogging metal although the effective diameter of the wheel has not been measurably reduced. Thus, the grinding surfaces may nevertheless require dressing to renew the clean effective grinding surface.

However, assuming that the grinding wheel has lost some abrasive from its working face, the dressing must occur with a frequency such that the wear on the wheel is less than the allowable limit of variation in surfaces being ground, so that some wheel surface remains to be removed by the dressing diamonds when they are moved in toward the wheel the predetermined amount. This latter inward movement should be the minimum amount required for effective dressing to economize on the grinding wheel and thus prolong its life.

In the grinding of small pieces removing a fraction up to a few thousandths of an inch of surface, a part W such as shown, of an inch or so in diameter, may require advancing the tool dressing slide and the main slide once for each ten to fifteen pieces being ground. Thus, the ratchet 209 is so connected with the valve 215 that it opens, say, on every tenth, twelfth or every fourteenth grinding cycle, as experience with a particular kind of work piece may prove most desirable.

Summarizing the order of steps of operation, the grinding wheel is running continuously; the work spindle is stopped and started for each piece; the grinding wheel and main slide move in quickly nearly to the point of contact, and then move slowly under precise control to complete the grinding.

This control is by the oil in the cylinder 85 and the passages controlled by the valve 119 as described. The passage 113 controls the rapid movement until the surface 116 enters the cavity 114, whereupon the valve 119 governs the final slow movement. The slow movement, of course, continues during the grinding and to a definite stop (collar 89, Fig. 2), thus governing the amount of material ground, and consequently the size of the finished workpiece.

After the grinding of each piece the valve handle H is moved to admit air under pressure in the system of return lines, stopping the work spindle and applying the brake, and shutting off the grinding liquid, as described. At the end of a given number of cycles, this handle movement will also effect the operation of diamond dressing tools through the valve 215 and its cycle counting mechanism so that the dressing movement and return redressing or "finishing touch" motion occurs when the main slide is in the retracted position. At the same time, the dressing tool slide 42 is moved through its ratchet wheel 65 toward the grinding wheel, and the screw of the main slide correspondingly advances the stop for the main slide a similar minute previse amount, through the ratchet wheel 60 actuated by its air cylinder and piston.

A problem in the oil control of air pressure actuation of such devices, and which has rendered many prior devices ineffective, is that of viscosity of the oil. It is, of course, desirable to have oil of quality and characteristic such that it flows uniformly at varying temperatures. However, I have found in extended experience that with the arrangement of the main slide controls and dressing tool controls shown and described, reasonable variation of temperature encountered in ordinary factory conditions does not adversely affect the uniform efficient operation of my apparatus, even when using oil of a character readily available.

From the foregoing description it will be seen that my system and apparatus accomplish the objectives set forth, and as indicated a large number of uniform pieces have been ground by relatively unskilled operators and without interruption, attaining much higher overall production in any given period of time than that heretofore attained by any devices known to the applicant, even when using highly skilled grinding machine operators.

Having thus described my invention, what I claim is:

1. The combination with a precision grinding wheel of diamond dressing tools and means for intermittently moving each tool across a surface of the grinding wheel, the surfaces being at an angle—one to the other, said means including a slide carrying each diamond tool, a plunger for actuating the slide, means for applying air to one end of each plunger, closures at the opposite end of each plunger and forming chambers containing a predetermined imprisoned amount of oil within the chambers, a connection between the oil chambers whereby the enclosed imprisoned oil is caused to flow by movement of one plunger and acts as a mechanical non-compressible liquid pushing means to move the other plunger in the opposite direction.

2. The device described in claim 1 in which the plungers are carried in cylinders having the ends opposite to that of the air application closed and connected by a closed passage and including a restricted orifice retarding and governing the movement of the plungers, while the oil acts as a positive pusher to effect the movement of one plunger as air pressure is applied to the opposite plunger.

3. A system and apparatus for automatic grinding of like parts having adjacent surfaces to be ground and at an angle to each other, and including means for dressing the grinding wheel surfaces after a predetermined number of piece-grinding cycles, the apparatus including means for holding and rotating the work-piece, a main slide and means for reciprocating it, supporting means for the grinding wheel and having a driving means for the grinding wheel, a secondary slide mounted on the main slide and a pair of diamond dressing tool-carrying slides mounted on the secondary slide and at an angle to each other corresponding to the angle of the grinding wheel surfaces, an air-actuated plunger for moving each of the dressing tool slides, an adjusting screw for advancing the secondary slide toward the grinding wheel, an adjusting screw for advancing the main slide with relation to its reciprocating means and toward the work, air-actuated plungers and associated ratchet wheels for moving the adjusting screws, and passages for supplying air under pressure and so connected as to act on all of said plungers, an air-actuated cycle counting plunger and a valve actuated thereby for controlling the air passages to the diamond dressing tools to effect movement of the tools across the faces of the grinding wheel following a predetermined number of piece grinding cycles.

4. The device described in claim 3, including air actuating means for reciprocating the main slide and an oil-flow controlling means effecting a fast movement toward the work and a retarded movement adjacent to the work and during grinding of the piece.

5. The device described in claim 3, including air actuating means for stopping and starting the work-carrying and driving means.

6. A grinding wheel dressing and truing device, including the diamond carrier and reciprocating slide therefor with means for mounting the slide to pass the diamond across the surface of a grinding wheel, a plunger connected with and actuating the slide, a cylinder therefor, means for bringing air under pressure to the plunger at one end of the cylinder, a closure forming a chamber at the opposite end of the plunger within the cylinder, oil in said chamber and a restricting passage permitting the escape of oil and governing the flow therefrom to control the rate of movement of the plunger and dressing tool and slide actuated thereby, the plunger being provided near its ends with sealing rings, and having a spiral groove encircling the plunger between the rings, and a passage being provided and leading from the groove to the open air to relieve air pressure toward the oil and preventing air entering the oil.

7. A grinding wheel dressing and truing device including two diamond carriers and reciprocating slides therefor and means for mounting each slide to pass its diamond across a surface of the grinding wheel, said means including a plunger connected with and actuating each slide, a cylinder for each plunger, means for bringing air under pressure to each cylinder at one end thereof, a closure forming a chamber at the opposite end of the plunger within each cylinder, and a closed conduit connecting the cylinders at the ends opposite to that to which air is admitted, oil in said chambers and in said conduit in an imprisoned contained quantity sufficient to fill one chamber and the passage formed by the conduit, said conduit having a restricted orifice in said passage controlling the rate of flow of oil from one chamber to the other under alternate application of air pressure to said plungers, whereby said imprisoned volume of oil constitutes a non-compressible actuating pusher element between the plungers, and whereby movement of one plunger in one direction by application of air effects reverse movement of the other plunger through the pushing action of the imprisoned oil.

8. A grinding wheel dressing and truing device comprising two reciprocating slides, and means for mounting the slides to reciprocate at an angle with relation to each other, a diamond dressing tool carried by each slide, a common support for said slides, one being positioned above the other, a plunger above one slide and a plunger below the other slide, a cylinder for each plunger and a rigid connection between each plunger and its adjacent slide, each slide and its associated plunger being movable in parallel paths, means for alternately applying air to one end of the plungers, means enclosing the other end of the plungers and for connecting them to contain a predetermined quantity of imprisoned oil which may flow from the end of one plunger to the other to actuate the latter plunger and move it in a reverse direction when air is applied to the first plunger, the connection having a restricting orifice governing the rate of flow and thus the rate of movement of the plungers.

9. An automatic grinding machine and wheel dressing mechanism comprising means for rotating a piece to be ground, a grinding wheel having two or more grinding surfaces at an angle, a main slide and means for mounting the grinding wheel thereon, a secondary slide carried by the main slide and individual tool dressing slides mounted on the secondary slide for each grinding surface of the grinding wheel, and means for moving the tool slides relatively to the wheel and to the secondary slide to effect the wheel dressing, means for reciprocating the main slide to move the grinding wheel toward and away from the grinding position for each successive piece to be ground, said latter means including an air-actuated piston and an oil-controlling piston and cylinder adapted to permit rapid movement away from the work and a rapid and a slow motion movement toward the work, a stop limiting the movement toward the work and thus controlling the amount of the grinding cut, means for adjusting the stop to progressively adjusted positions toward the work to compensate for the wheel dressing, and means for moving the secondary slide an approximately equal amount, and means actuating the adjusting means consequent upon a predetermined number of grinding cycles.

10. In a grinding machine, the combination of means for supporting and rotating a work-piece, a continuously driven grinding wheel and a main slide positioned to move the grinding wheel toward and away from the work-piece, wheel dressing devices and a slide carrying the same mounted upon the main slide, means for reciprocating the main slide and the wheel dressing devices, including air operated plungers and oil-containing cylinders and plungers therefor, and passages for oil caused to flow by movement of said plungers and restricting orifice means in each of said passages and associated with each of the means for reciprocating the main slide and the means for moving the wheel dressing devices whereby rate of movement of said plungers is controlled by retarding flow of said oil, cycle counting means connected with the main slide air-actuating means for controlling the actuation of the wheel dressing devices consequent upon and following a number of main slide actuations, an adjusting means for re-positioning the main slide and dressing devices at each tool dressing cycle, and a manually operated valve and passages therefrom leading to the actuating means for the main slide and tool truing slides and arranged to control said passages to reverse the movement of the main slide and effect a return action of the truing tools.

11. In a grinding machine for successively grinding surfaces of uniform dimension on like pieces, a combination of means for rotating a work-piece, a grinding wheel and a main slide support therefor, means for reciprocating the main slide toward and away from grinding position for each successive piece to be ground, a stop limiting the movement of the slide and grinding wheel toward the work, a piston rigidly connected to said stop, a cylinder embracing the piston and rigidly connected to the slide, a screw for moving the position of the stop, fluid means for moving the cylinder and thus the slide with relation to the piston and stop, a grinding wheel dressing tool, a secondary slide therefor mounted on the main slide and movable toward the grinding wheel, means for intermittently adjustably advancing the secondary slide and dressing tool, and means for actuating the dressing tool, a cycle counting mechanism and means connected with the main slide stop screw for adjusting it consequent upon a given number of cycles corresponding to a predetermined number of grinding operations.

12. The combination defined in claim 11, in which is provided an axially stationary nut rotatable on the main slide screw, and means for rotating the nut to move the stop consequent upon the actuation of the means connected with and responsive to the cycle counting means.

13. A grinding machine of the character described, the combination of means for rotating a work-piece, a main slide, a grinding wheel mounted thereon and means for moving the main slide and grinding wheel toward and away from the work-piece, said means including an air cylinder and an oil cylinder, a reaction screw member rigidly connecting said pistons, an axially fixed nut on the screw member, a stop rigid with the screw member and serving to limit the movement of the main slide and wheel toward the work, a secondary slide mounted on the main slide, wheel dressing tools and means for actuating the same carried on the secondary slide, a screw member for advancing the secondary slide toward the grinding wheel, means for bringing air to the air cylinder to cause it to move along its piston to reciprocate the main slide, oil in the oil cylinder at opposite sides of the piston and means controlling the flow thereof to permit relatively rapid and slow finishing inward movement of the cylinders and main slide and grinding wheel, cycle counting and controlling means and an air cylinder governed thereby for intermittently rotating the main slide screw adjustment nut and the dressing tool secondary slide screw consequent upon a predetermined number of actuations of the main slide, and means for actuating the dressing tool consequent upon each advance of the dressing tool slide, the amount of movement for resetting the stop corresponding to the amount of movement of the secondary dressing tool slide.

14. In a grinding machine, the combination of means for rotating a piece to be ground, a grinding wheel and support therefor including a main slide and means for moving the support and slide toward and away from grinding position, said means including an air-operated piston and cylinder, the cylinder being rigidly connected to the slide, a piston therein and piston rod therefor having screw threads thereon, an axially fixed rotatable nut on said screw threads, a stop on said piston rod limiting the movement of the slide and support and wheel toward the work, an aligned cylinder rigid with the first cylinder and having a piston therein rigidly connected to the piston of the air cylinder, oil contained in the last-named cylinder and passages governing the speed of motion of the cylinders on the pistons, a grinding wheel dressing tool adjustably mounted on the main slide and means for actuating said tool and for moving it toward the grinding wheel, means for turning the axially fixed nut on the piston rod threads, and cycle counting and responsive means for effecting operation of the dressing tool and for turning said nut consequent upon a given number of the actuations of the main slide.

15. In a grinding machine, the combination of means for rotating a pieec to be ground, a grinding wheel and support therefor, means for moving the support toward and away from grinding position, and means for stopping the support to control the dimension of the surface being ground, said means for moving the support comprising an axially adjustable piston rod and a pair of aligned pistons rigidly connected therewith, a cylinder for each of said pistons, said cylinders being rigidly connected together and rigidly connected to the support, means for bringing actuating air to one of the cylinders to move it on its piston and correspondingly move the support away from and back to the stop, oil confined in the second cylinder at both sides of its piston, said latter piston having two passages therethrough, a check valve in one passage permitting uniform relatively rapid movement in one direction, means for partially closing the other passage when the cylinders and slide and grinding wheel move toward the work, said stopping means comprising an abutment member rigid on the piston rod.

16. In a grinding machine, the combination of means for rotating a piece to be ground, a grinding wheel and support therefor, means for moving the support toward and away from grinding position comprising an axially adjustable piston rod and a pair of aligned rigidly connected pistons therewith, a cylinder for and embracing each of said pistons, said cylinders being rigidly connected together and connected to the support, means for bringing actuating air to one of the cylinders to move it on its piston, oil confined in the second cylinder at both sides of its piston, said last-named piston having a passage therethrough, a check valve in said passage permitting relatively rapid movement in one direction and said last-named piston having a second passage therethrough, a member rigid with the cylinder and telescoping into and fitting said second passage, and said telescoping member and the cylinder having a shunt passage leading through said member and into the second passage in the piston, and an adjustable valve for controlling restricted flow through the shunt and telescoping member, the telescoping member being of such a length as to effect restricted flow near one end of relative movement of the piston and cylinder.

References Cited in the file of this patent

UNITED STATES PATENTS

| | | |
|---|---|---|
| 1,522,465 | Kimmel | Jan. 6, 1925 |
| 1,919,288 | Bath | July 25, 1933 |
| 1,976,366 | Ott | Oct. 9, 1934 |
| 2,008,128 | Condon et al. | July 16, 1935 |
| 2,023,704 | Silven | Dec. 10, 1935 |
| 2,335,356 | Price et al. | Nov. 30, 1943 |
| 2,417,707 | Seyferth et al. | Mar. 18, 1947 |
| 2,417,714 | Stewart et al. | Mar. 18, 1947 |
| 2,418,149 | Addicks et al. | Apr. 1, 1947 |
| 2,447,478 | Rundt | Aug. 17, 1948 |

FOREIGN PATENTS

| | | |
|---|---|---|
| 664,143 | Germany | Aug. 20, 1938 |